United States Patent [19]

Cooper

[11] 4,105,185

[45] Aug. 8, 1978

[54] CONNECTION PLATE FOR PANELS OF A CONCRETE FORM

[76] Inventor: Leonard W. Cooper, Box 1389, Salmon Arm, British Columbia, Canada

[21] Appl. No.: 785,277

[22] Filed: Apr. 6, 1977

[30] Foreign Application Priority Data

Oct. 1, 1976 [CA] Canada ................................. 262507

[51] Int. Cl.$^2$ ............................................. E04G 17/02
[52] U.S. Cl. ............................... 249/194; 249/219 R; 249/219 W; 403/401
[58] Field of Search ................................. 249/48–49, 249/168, 194, 219 R, 219 W; 403/231, 409

[56] References Cited

U.S. PATENT DOCUMENTS

| | | | |
|---|---|---|---|
| 2,891,590 | 6/1959 | Olson | 249/48 |
| 3,066,962 | 12/1962 | Koehler | 249/194 |
| 3,356,400 | 12/1967 | French | 403/401 |
| 3,632,146 | 1/1972 | Buzby et al. | 249/219 R |

FOREIGN PATENT DOCUMENTS 456,907  4/1950  Italy ........................................... 249/48

Primary Examiner—Francis S. Husar
Assistant Examiner—John McQuade
Attorney, Agent, or Firm—Beveridge, DeGrandi, Kline and Lunsford

[57] ABSTRACT

A connector plate for the panels of a concrete form corner constitutes an elongated rectangular plate having a first portion with holes for bolting to an edge portion of a panel so that a second, locking portion extends beyond the edge of the panel. The locking portion has a notch the outermost land of which is parallel to the edge of the panel. The notch is greater in width than the plate thickness, and the arrangement is such that the notch can interengage with the notch of an identical connector, inverted relative thereto, to hold together the edges of two mutually perpendicular panels to form a corner construction. The connector plate includes apertures for whaler bars which can be placed in position to abut the outermost surfaces of the panels and to prevent distortion during concrete pouring.

6 Claims, 3 Drawing Figures

CONNECTION PLATE FOR PANELS OF A CONCRETE FORM

The present invention relates to connectors for holding together adjacent edges of the panels of a form, for example, the kind of form used as a mould for concrete pouring of columns or walls, or in an earth-retaining form.

For many concrete pouring operations it is necessary to provide forms consisting of vertical panels set perpendicularly to each other and meeting at adjacent edges to make a corner. Various means are known for holding the corner edges of the panels together during pouring, while allowing the panels to be easily removed when the concrete has set.

One common connector device for the panels of concrete forms takes the form of metal strips which define, adjacent the edges of the panel, apertures parallel to the edges of the panel, such that the apertures can be superimposed when the panels are put in position, and so that a vertical pin can be inserted through the apertures, producing a connector which resembles a hinge and which is suitable for a corner. Other more complicated devices are known, for example, from the Canadian Pat. No. 617,553, issued Apr. 4, 1961, and U.S. Pat. No. 2,727,294, issued Dec. 20, 1955, both to Arrighini. These systems have in common the need for an auxiliary part (for example, the hinge pin part in the traditional method or the wedges shown in the Arrighini patents), which parts have to be taken around from site to site and fitted each time.

A construction which avoids the use of such separate parts is shown in U.S. Pat. No. 3,107,087, issued Oct. 15, 1963, to Williams, but this does not show a connector for joining the edges of large panels, but rather a device for holding together fairly narrow panels used in making a column.

The present invention provides a connector for the panels at the corner of a concrete form which allows such panels to be connected together without the use of auxiliary connecting parts, and which provides panels which are particularly easy to assemble. Also, the panels are interchangeable. A further feature is the provision of means for retaining whaler bars which can be used to prevent bulging of the panels.

In accordance with one aspect of the invention, a connector for the panels of a form comprises a plate having a first portion adapted to be fixed to a panel so as to leave a second, locking portion projecting beyond a side edge of the panel, the locking portion having an abutment surface which faces the side edge of the panel when the plate is fixed thereto. The abutment surface is capable of retaining the side surface of an identical connector when the two connectors are fixed to mutually perpendicular panels and inverted relative to each other. The locking portion also has an aperture extending at least partially beyond the abutment surface, relative to the first portion, for receiving the end of a whaler bar.

The abutment surface may be the outermost land of a transverse notch in the locking portion of the plate.

In accordance with another aspect of the invention, the corner of a concrete form comprises at least two mutually perpendicular panels each of the panels having connector plates at its side edges, each connector plate having a first portion overlapping and fixed to a surface of a panel and having a second, locking portion projecting beyond the side edge of the panel, said locking portion having an abutment surface facing the side edge of the panel and capable of retaining a side surface of an identical connector, inverted relative to the first-mentioned connector, and fixed to a panel which is adjacent and perpendicularly arranged to the first mentioned panel.

The invention will now be described in more detail with reference to the accompanying drawings, in which.

Figure 1:
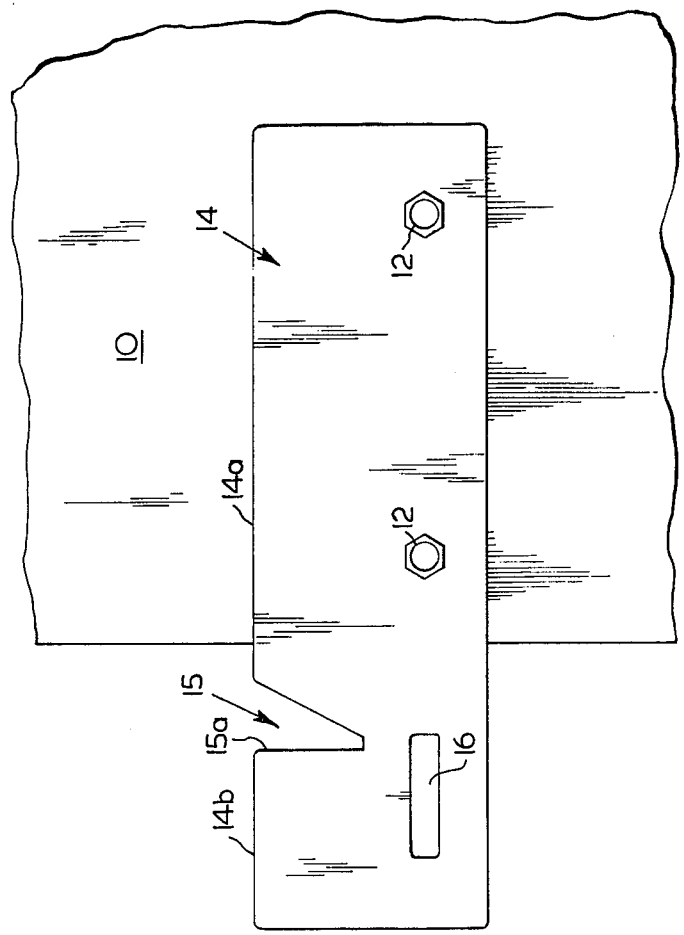
FIG. 1 shows an elevation of a portion of a panel provided with a connector.

Referring to the drawings, 10 is a wooden panel for a concrete form which may be perhaps one inch in thickness. The side edge portion of the panel 10 shown in FIG. 1 has fixed thereto, by two bolts 12, a connector plate 14, which is an elongated flat rectangular plate of ⅛th inch thickness steel. Typical dimensions for the plate would be 2 inches in width and 7 inches in length, although of course the size of the plate will depend on the sizes of the panels to be held and the forces applied thereto. Several plates will be used at each side edge, being spaced along each side edge usually about 20 inches or less apart, depending on the strength of joint required.

It will be seen that plate 14 has a first portion 14a which is secured to the panel 10, and a second portion 14b which performs the locking function. The portion 14b has a notch 15 communicating with the upper edge of the plate and extending across about half the width of the plate. This notch has an outermost land 15a which is parallel to the outer edge of the plate 10, and spaced away from the outer edge of this plate by an amount which is equivalent to the thickness of the plate 14 and the thickness of the panel 10. The innermost land of the notch 15 is sloping so that the notch is relatively wide at its top to provide an enlarged entry into the notch, and slopes down to a narrow portion which is just slightly wider than the thickness of plate 14.

Below the level of notch 15, and situated largely beyond the outer land 15a of this notch, is an aperture 16 for a whaler bar. This aperture is elongated in the longitudinal direction of the plate.

Figure 2:
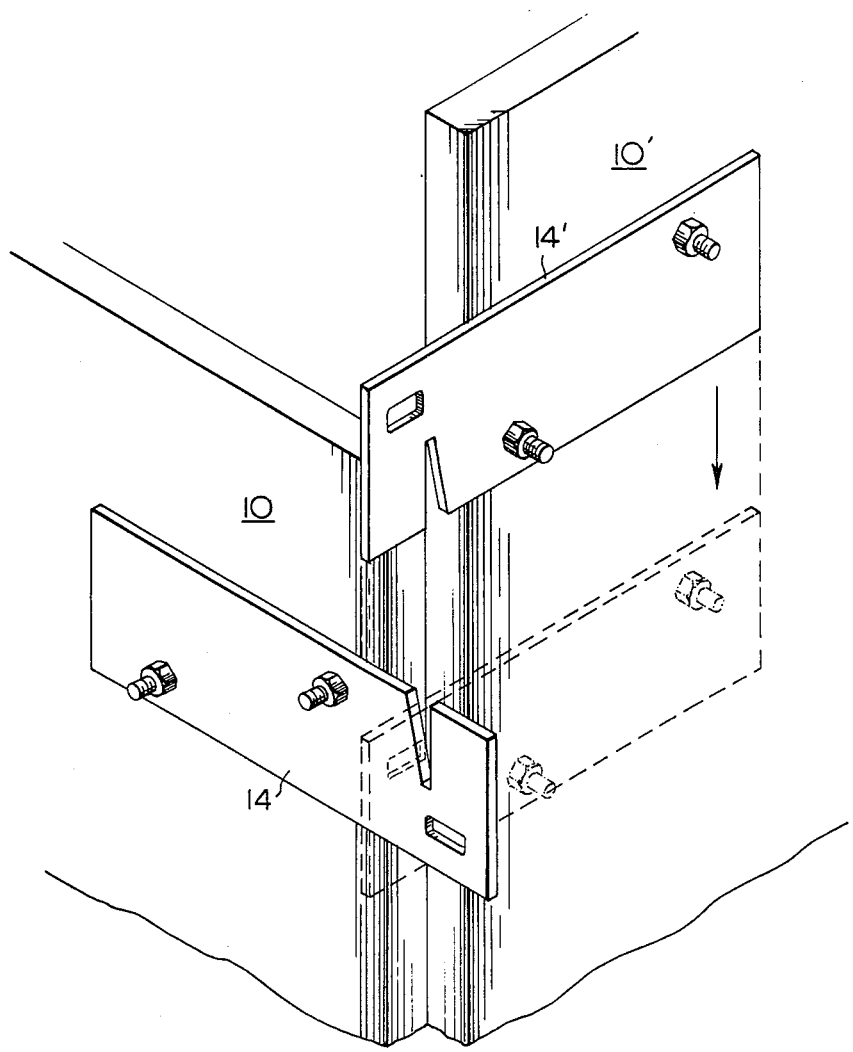
FIG. 2 shows a similar view of a completed portion of corner including two connectors, during the assembly thereof.

FIG. 2 illustrates how plate 14 attached to a panel 10 co-operates with an identical plate 14' attached to an identical panel 10' but with the latter panel being inverted relative to items 10 and 14. As illustrated the panel 10' is fixed in position relative to panel 10 simply by placing together the corners of the panels and sliding downwards the panel 10' until the notches 15 of the two connector plates interengage. Upon engagement, the vertical lands 15a of each of the connector plates contacts the outermost surface of the engaging connector plate to hold this firmly in place. No further items such as hinge pins or wedges are required.

Figure 3:
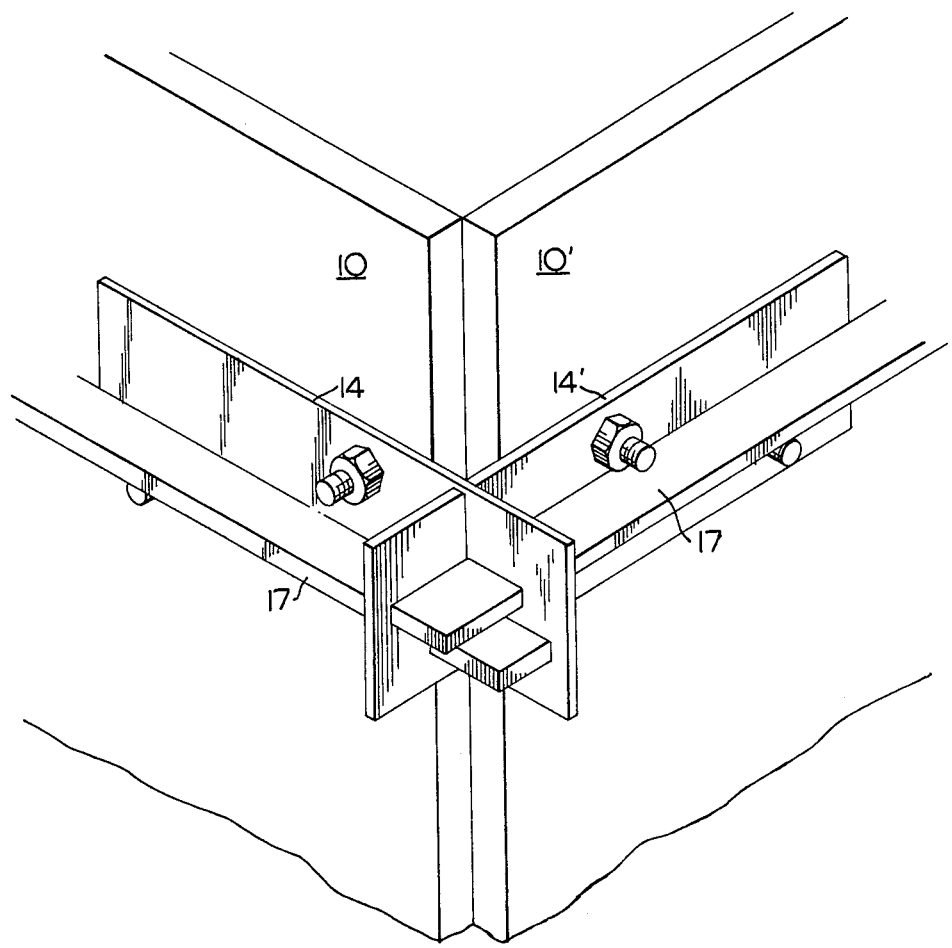
FIG. 3 shows a similar view of a completed portion of a corner including whaler bars.

The final form of assembly is shown in FIG. 3, in which the notches of the plates 14 and 14' are fully engaged, holding the inner corners of the panels 10 and 10' together in a suitable manner, and FIG. 3 shows the way in which whaler bars 17 can be inserted through the slots 16 and will provide support for the outer surfaces of the panels to prevent these bulging outwardly during concrete pouring. The whaler bars 17 are simply steel bars of flattened section suitable for being received in the apertures 16, and disposed in a horizontal manner so as to have the maximum resistance to lateral bending.

It can be seen that panels having the connector plates of this invention can be set up extremely easily, without extra pieces, and that all panels can be identical and interchangeable. Furthermore, the apertures for the whaler bars allow these to extend the full width of the panels, instead of stopping short of the corners as in some conventional systems. It has been found that the use of the panels and connector plates in accordance with this invention reduces the time of assembly, as compared to the hinge pin method described above, by between one-third and one-fifth.

It may also be noted that in contrast to some known systems, the connectors themselves are flat and free of protuberances, and the fastening means or bolts 12 are the only protuberances on the panels which project beyond the plane of the panel and connector.

I claim:

1. A connector for panels of a form, comprising a flat metal plate of elongated rectangular shape with holes in a first longitudinal portion thereof for fixing the first portion to a panel, the plate having a second longitudinal portion having a notch communicating with one of the longer sides of the plate, the notch having a width which is greater at all points than the thickness of the plate so that said notch can interengage with a notch of an identical connector when the two connectors are fixed to mutually perpendicular panels and inverted relative to each other, with an outermost land of the notch of the first-mentioned connector providing an abutment surface which retains the other connector said abutment surface extending perpendicularly to the longer sides of said plate, and the innermost land of the notch sloping away from said outermost land to provide an enlarged entry into said notch, said second portion also having an aperture extending at least partially beyond said abutment surface, relative to the first portion, for receiving a whaler bar extending perpendicularly to the connector, said connector being free of protuberances beyond the plane thereof.

2. A connector according to claim 1, wherein said aperture is elongated in the longitudinal direction of the plate.

3. A concrete form having a corner comprising two mutually perpendicular panels each of the panels having connectors at its side edges, each connector having a first portion overlapping and fixed to a surface of one of the panels and having a second locking portion projecting beyond the side edge of the one panel, each said locking portion having an abutment surface facing the adjacent side edge of the one panel to which said connector is fixed, the abutment surface of each connector of one panel, retaining the side surface of a connector of the other panel which latter connector is inverted relative to the connector of the one panel each of said connectors being flat and having an aperture extending at least partially beyond said abutment surface, said corner further comprising whaler bars extending along said panels and having end portions protruding through and held by one apertures of said connectors.

4. A concrete form according to claim 3, wherein said abutment surface is the outermost land of a transverse notch in said locking portion.

5. A panel assembly for use in making a concrete form, comprising a flat panel having several connectors spaced along one edge thereof, each connector comprising a flat metal plate of elongated rectangular shape having a first longitudinal portion thereof over-lapping and secured to said panel, and having a second portion projecting beyond said edge of the panel, said second portion having a notch communicating with one of the longer sides of the plate, the notch having a width which is greater at all points than the thickness of the plate so that said notch can interengage with a notch of an identical connector fixed to a similar panel with the interengaging connectors being inverted relative to each other, the notch of the connector of said first-mentioned panel having an outermost land which provides an abutment surface for retaining a connector interengaging therewith, said abutment surface extending parallel to said one edge, and the innermost land of the notch sloping away from said outermost land to provide an enlarged entry into said notch, said second portion also having an aperture extending at least partially beyond said abutment surface, relative to said first portion, for receiving a whaler bar.

6. A panel assembly according to claim 5, wherein said connectors are secured to said panel by fastening means, which fastening means constitute the only protuberances beyond the plane of said connectors.

* * * * *